G. F. BUTTERFIELD.
SHOE SOLE VULCANIZING AND APPLYING APPARATUS.
APPLICATION FILED FEB. 1, 1909.

1,111,436.

Patented Sept. 22, 1914.
2 SHEETS—SHEET 1.

WITNESSES
O. T. Palmer
Henry O Cushman

INVENTOR
George F. Butterfield
by A. A. Spencer,
Attorney

G. F. BUTTERFIELD.
SHOE SOLE VULCANIZING AND APPLYING APPARATUS.
APPLICATION FILED FEB. 1, 1909.

1,111,436.

Patented Sept. 22, 1914.
2 SHEETS—SHEET 2.

WITNESSES
INVENTOR
George F. Butterfield
Attorney

UNITED STATES PATENT OFFICE.

GEORGE F. BUTTERFIELD, OF CAMBRIDGE, MASSACHUSETTS, ASSIGNOR TO GRACE I. BUTTERFIELD, OF CAMBRIDGE, MASSACHUSETTS.

SHOE-SOLE VULCANIZING AND APPLYING APPARATUS.

1,111,436.  Specification of Letters Patent.  Patented Sept. 22, 1914.

Application filed February 1, 1909. Serial No. 475,355.

*To all whom it may concern:*

Be it known that I, GEORGE F. BUTTERFIELD, of Cambridge, in the county of Middlesex and State of Massachusetts, have invented certain new and useful Improvements in Shoe-Sole Vulcanizing and Applying Apparatus, of which the following is a specification.

Figure 3:
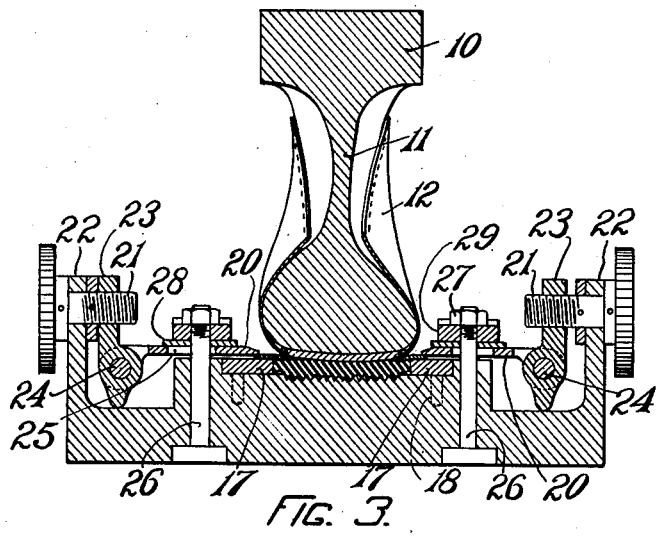

This invention relates to means for molding and vulcanizing rubber soles to the bottoms of leather boots and shoes, such means consisting, in part, in a new combination of foot-form and pressure means, for holding the shoe firmly upon the rubber in the mold, with slotted adjustable clamps applied above the welt, bolts from the base plate through such slots see Figure 3 and holding means applied to such bolt tips to hold the shoe down by its clamped edges. By this combination of parts I provide a compact shoe-holding frame, the base plate being a mold plate adapted to be placed upon the vulcanizer with the clamps in position for use, so that the rubber can be partially vulcanized and then, while still held by the clamps, the shoe can be removed in its frame to cool slowly and admit others to a position on the vulcanizer.

My invention also consists in sole shaped molds formed in a base plate with outwardly projecting edges and a detachable marginal wall fitting on said edges, to shape, marginally, the rubber sole in the mold during vulcanization. The object of this latter construction is to facilitate making with each bottom mold two or more different widths or thicknesses of sole for each size in length of shoe to which the compounded rubber soles are being or to be applied. This object I attain by applying, around the sole and shank portions of the mold, for each length-size of shoe, a detachable edge-wall of the desired size as to width and thickness, two or three different interchangeable widths, especially along the tap-sole portions, being contemplated. Guide pins and holes to receive them, in the respective parts, serve to accurately locate them with relation to each other and to the heel mold. Variations in length may also be provided for by these detachable edge walls. With these detachable and interchangeable edge-walls, of varying dimensions, the mold-plate shown becomes a sort of universal mold, radically unlike the ordinary dug-out or sunken mold having its edge-walls integral with the engraved bottom. The result is decided economy in mold construction and in storage space otherwise required for superfluous bottom molds. My new construction greatly facilitates changes from one width or thickness of sole to another.

The improved mechanism employed by me in this shoe manufacture has other novel features hereinafter more fully described with reference to the accompanying drawings, all being especially referred to in the appended claims.

Figure 1:
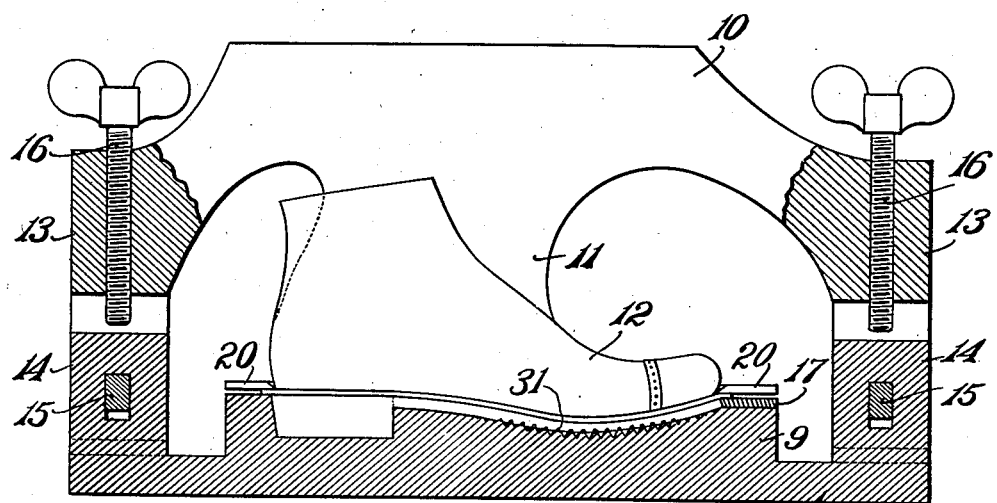
Figure 2:
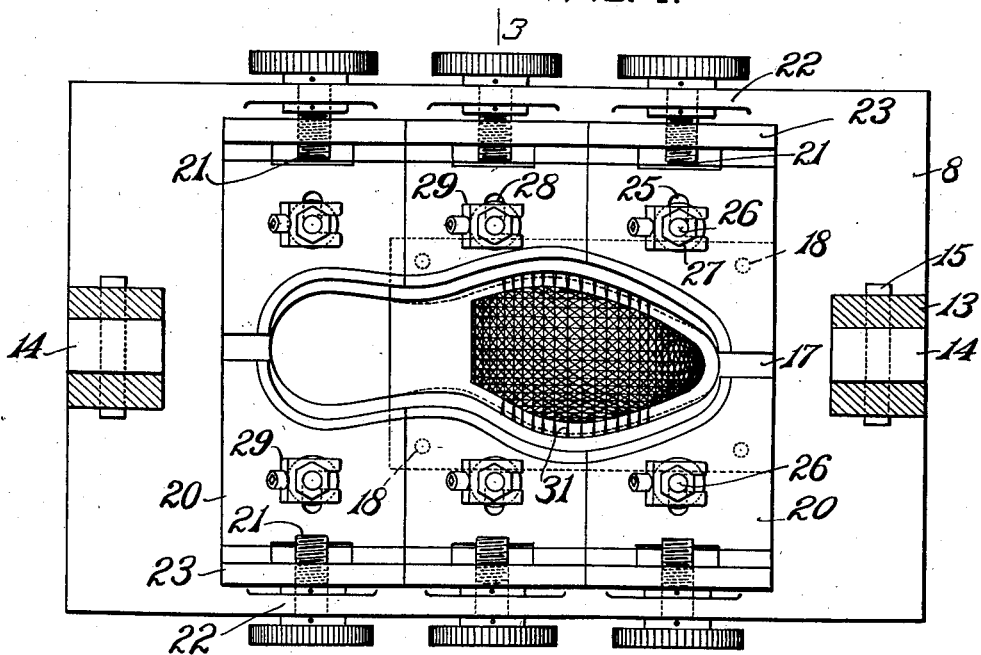
Figure 4:
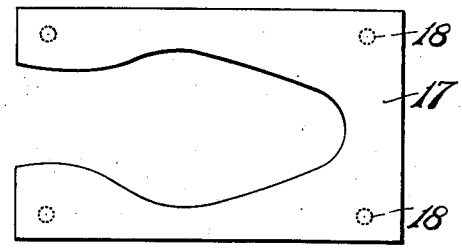
Figure 5:
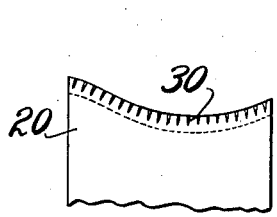
Figure 6:
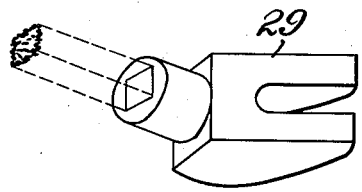

In the drawing, Fig. 1 is a side view, partly in vertical section, showing one of the vulcanizing molds and its cover, with the shoe in position between them mounted on the foot form, depending from the cover. Fig. 2 is a plan view of the base-plate and mold, showing the adjustable clamps and adjacent parts, the cross-bar and shoe being removed. Fig. 3 is a vertical transverse section taken about on the line 3—3 of Figs. 1 and 2. Fig. 4 is a plan of the detachable edge wall of the mold plate. Figs. 5 and 6 are details hereinafter explained.

The apparatus comprises a base-plate 8, having, about centrally, a sole-shaped or a sole and heel-shaped mold 9, the bottom portion being engraved or formed the converse of the sole and shank desired, and with or without a heel. A bridge or cross-bar 10, is provided, formed with a depending foot-form 11, on which the shoe 12, in process of construction, is mounted and supported in position to fit accurately over the mold and upon the vulcanizable rubber compound therein. This bridge or bar 10 also has depending end portions 13, recessed underneath to receive and fit over upright guide posts 14 erected on the end portions of the base-plate see Figs. 1 and 2. The parts 13 and 14 are transversely recessed to receive wedges or tapering keys 15, Fig. 1, which draw down the shoe upon the rubber, or have equivalent holding devices. Screws 16, threaded into and extending down through end portions 13, bear at their tips on guide posts 14, to temporarily support the foot-form and shoe above the mold and lower them gradually thereon. These screws, 16, serve also to start the cross-bar, foot-form and shoe upwardly from the mold when desired.

A special feature of this invention, best shown in Figs. 1, 3 and 4, is the detachable edge wall 17 for the mold 9, especially for its deepest portion, around the tap-sole, where it resists lateral expansion of the rubber compound, in vulcanizing, and determines the configuration of the sole edge. In Fig. 3 the base plate 8 is shown recessed to receive the edge walls which may bear, outwardly, against the vertical walls of the recess, and are shown as furnished with rigid guide pins 18, entering corresponding perforations in the base plate. Slight changes in area inclosed by the edge wall vary the width or length of sole sufficiently for the usual modifications in sizes.

The edge clamps 20, conform, at their beveled forward edges, to the outline of the shoe at the junction of the upper and the welt, and are adjustably moved, forward and back, by suitable means, such as screws 21, mounted, for rotation only, in standards 22 on the base plate and threaded into movable upright members 23, each pivoted at 24 to one of the clamps 20. The main novelty in the clamping device is the slot 25 through its flat body to receive the vertical bolt 26 screwed into or erected on the base plate 8, such bolt having at its upper end, a head or nut 27 for adjusting the pressure. I prefer to employ a washer 28 above the clamp and a forked wedge or cam 29 between the washer and the bolt head or nut, for quick application of the pressure with variations in thickness of material. This cam is illustrated in Fig. 6 as formed with an end socket to receive a detachable handle, shown in dotted lines. On the under side of each clamp, adjacent to its bearing edge, I form a line of slight protuberances 30, see Fig. 5, which, in practice, produce on the upper face of the welt a series of indentations having the appearance of a line of stitching.

The mold 9 for the sole-bottom has about the usual curvature lengthwise, as in Fig. 1, but transversely it is flat or horizontal, aside from ordinary corrugation or ornamentation, see Fig. 3. Along each side of the tap-sole portion of the mold, as shown in Fig. 2, I form short, parallel, raised ribs, 31, which produce corresponding grooves in the margins of the shoe sole bottom, such grooves tending to increase the flexibility of the sole and to decrease the strain upon it in walking.

My present invention, which is merely a portable shoe-holding frame, should be distinguished from the vulcanizing machine set forth in my U. S. Letters Patent, No. 667,674, dated February 12, 1901. A vulcanizing steam chamber with steam pipe connections was an essential element of said machine, the whole apparatus being necessary to the treatment of a single shoe. With my present improvement a dozen or more shoes may be simultaneously treated, each being held by one of these portable frames upon the rubber in its own mold plate, all introduced side by side into the heating chamber.

In practice a series of these shoe holding frames, with the shoe on the foot form, over and in contact with the rubber in the mold and with clamps in position, will be placed between the platens of the vulcanizing press, the upper platen pressing downwardly upon the flat central portion of the cross-bar 10, to resist the expansion of the rubber. When the vulcanization has sufficiently progressed the platen pressure is relaxed and the frames complete and shoes held thereon are removed so that the rubber may cool slowly and other frames and shoes be substituted in their place.

I do not claim broadly a mold in two parts, one part in the nature of a cover for the other, as in the old time bullet mold. Neither do I claim such a mold or process as is set forth in the Wimley Patent No. 13,073, dated June 12, 1855, where the two members of the rim or cover are pivoted and clamped together to surround a space in the base portion A, to be filled with melted gutta percha, upon which and upon the edges of the rim the lasted shoe is to be forcibly held for a few minutes while such substance enters perforations in the shoe bottom to harden. This gutta percha process and apparatus is wholly foreign to my invention. So, also, is the method and the apparatus for vulcanizing hard rubber soles on uncured rubber boot and shoe bottoms, set forth in the Austin Patent No. 834,451, dated Oct. 30, 1906. My apparatus is designed only for vulcanizing plastic rubber soles and heels upon leather soles of boots and shoes.

I claim as my invention:

1. The shoe-holding apparatus described, comprising a base-plate formed with a sole-shaped mold to receive the vulcanizable rubber compound which, when cured, is permanently united to the shoe bottom; vertical clamp bolts rigidly secured to the base plate; a cross-bar carrying a depending foot-form for the shoe and means for holding down the foot-form and shoe, upon the rubber in the mold in combination with adjustable marginal clamps connected to the base-plate and slotted to receive the pressure bolts rising from said plate and with suitable terminal fastenings, substantially as set forth.

2. The shoe-holding apparatus described, comprising a base plate having a suitable mold to receive the vulcanizable compound and uprights or guide posts at the ends of the mold, a bridge or cross-bar having a depending foot-form for the shoe, depending end portions conforming to said uprights and pressure means engaging such parts, for tightening the foot-form and shoe upon the rubber in the mold, in combination with supporting and lifting means in such end portions, adapted to hold the foot-form and connected parts temporarily above the mold and to later assist in removing them therefrom, substantially as set forth.

3. The shoe-holding apparatus described, comprising a base plate having a suitable mold to receive the vulcanizable compound, a cross-bar having a flattened central portion with a depending foot-form, and end portions having pressure devices adapted to engage uprights rising from the base plate, in combination with slotted clamping plates adjustable to the contour of the shoe, bolts rising from the base plate through such slots and with terminal fastenings for applying the clamp pressure, substantially as set forth.

4. In a shoe-sole vulcanizing mold, a bottom portion comprising a base-plate formed the converse of the bottom of the sole or sole and heel desired and having outwardly extending marginal portions, in combination with detachable and interchangeable edge-walls for such mold, suitably anchored to and made to fit upon said marginal portions, such edge-walls being formed distinct from and independent of the bottom portion of the mold and of the clamps or mechanism for holding the boot or shoe in position during treatment, substantially as set forth.

In testimony whereof I have affixed my signature, in presence of two witnesses.

GEORGE F. BUTTERFIELD.

Witnesses:
  A. H. SPENCER,
  HENRY O. CUSHMAN.